No. 864,564. PATENTED AUG. 27, 1907.
J. R. ROGERS.
LINOTYPE MACHINE.
APPLICATION FILED MAY 16, 1907.

No. 864,564. PATENTED AUG. 27, 1907.
J. R. ROGERS.
LINOTYPE MACHINE.
APPLICATION FILED MAY 16, 1907.

Witnesses:
D. E. Burdine
L. E. Morrison

Inventor
J. R. Rogers
By his Attorney
P. T. Dodge

No. 864,564. PATENTED AUG. 27, 1907.
J. R. ROGERS.
LINOTYPE MACHINE.
APPLICATION FILED MAY 16, 1907.

Witnesses:
D. E. Burdin
L. E. Morison

Inventor
J. R. Rogers
P. T. Dodge
By his Attorney

No. 864,564.

PATENTED AUG. 27, 1907.

J. R. ROGERS.
LINOTYPE MACHINE.
APPLICATION FILED MAY 16, 1907.

Witnesses:
D. E. Burdine
L. E. Morrison

Inventor
J. R. Rogers
By his Attorney
P. T. Dodge

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

No. 864,564.      Specification of Letters Patent.      Patented Aug. 27, 1907.

Application filed May 16, 1907. Serial No. 373,920.

*To all whom it may concern:*

Be it known that I, JOHN R. ROGERS, of the borough of Brooklyn, county of Kings, and State of New York, have invented a new and useful Improvement in Linotype-Machines, of which the following is a specification.

My invention has reference to slug-casting or linotype machines of the general character shown in Letters Patent of the United States No. 557,232. In these machines, a tilting frame supports a series of inclined converging wires or guides on the upper ends of which suspended matrices are stored. As the various characters are designated on the keyboard, the matrices are released and permitted to descend the wires by gravity to a common line between the parallel ends of the wires in front of a mold in which the slug or linotype is cast against them, after which the frame is tilted backward and the inclination of the wires thereby reversed, so that the matrices return along the respective wires to their original places, the frame being thereafter tipped forward again in order to restore the wires to their original positions preparatory to the composition of a second line.

The composing, casting and distributing operations, and the return of the frame to its original position, must all take place in connection with the production of one slug or line before the composition of a second line may be commenced.

The aim of my invention is to increase the speed of the machine by reducing the amount of time lost between operations. To this end I construct the machine so that two lines may be composed and slugs cast therefrom before the distribution occurs, both lines being distributed by one operation.

I have represented in the accompanying drawings details of construction which will answer their purpose commercially, and it will be understood by the skilled mechanic that the invention is capable of embodiment in various forms, and that as regards the form and arrangement of the parts, the details may be widely modified.

Referring to the drawings, A represents a rigid base-frame giving support to the various operative parts of the machine except the top-frame.

B represents the top-frame connected at its rear end to the base-frame by horizontal pivots $a$, so that it may be canted or tilted upward and backward from the operative position. This top-frame contains a series of fixed wires or guides which descend in converging lines toward the front of the machine where they are arranged in two vertical parallel tiers.

C represent the matrices suspended from the guide $b$ of the top-frame by eyes or hooks at their upper end. They stand normally at the upper ends of the wires and are held in place by escapement devices connected with finger-keys in a keyboard D, so that when a key is actuated, the corresponding matrix will descend to the line in course of composition.

All of the foregoing parts may be constructed and arranged to operate in essentially the same manner as in Patent No. 557,232.

The matrices descending one after another to the line, assemble side by side with the vertical rear edges resting against a fixed support or alining abutment E. They are pressed against the support E at the proper time by a horizontal rocking pressure bar F, one edge of which bears against a shoulder on the matrices in order to force their ends downward into a solid support $f^2$, to insure the alinement of their characters.

The forward end of the matrix line is arrested against a fixed shoulder G. The opposite end of the line is confined by an arm H standing normally out of the path of the incoming matrices, but capable of being rocked up behind the end of the line so as to limit its elongation when justification occurs, this action of this member being essentially the same as in the patent above referred to.

Figure 2:
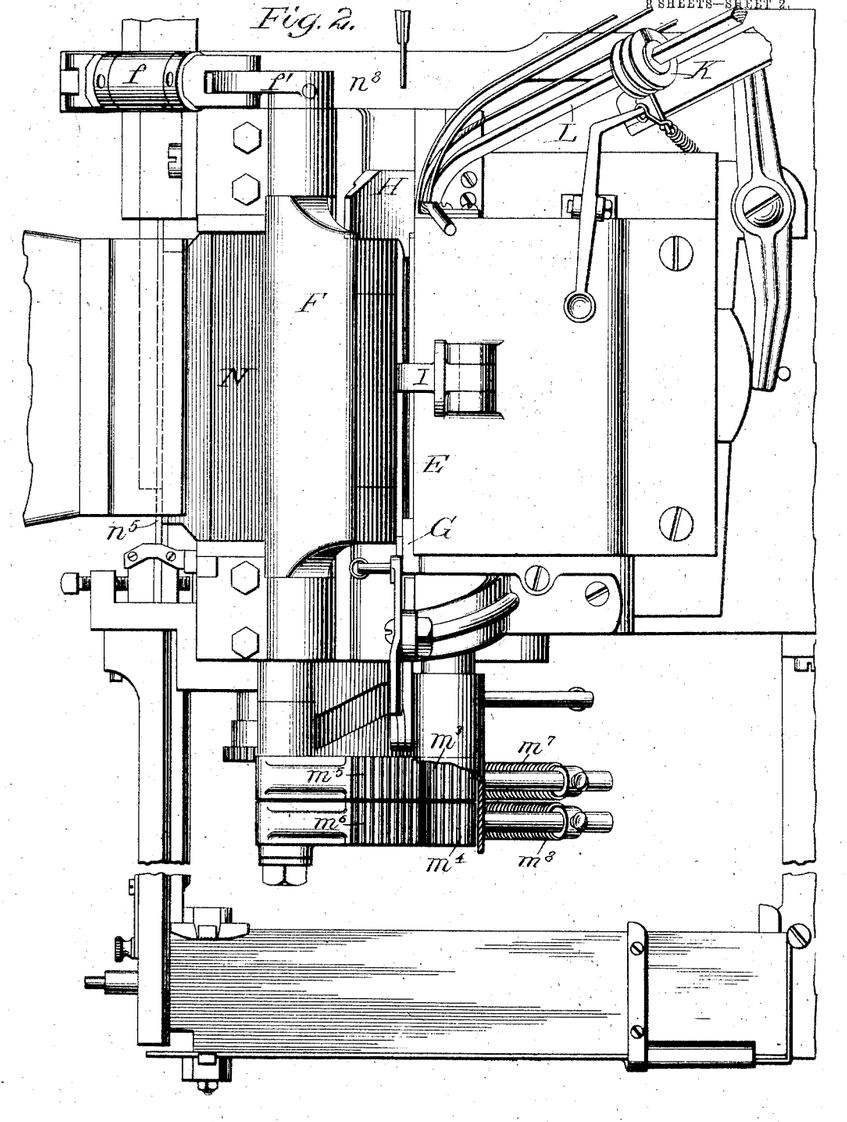
Fig. 2 is a plan view of that part of the machine in which the matrices are assembled and the slug is cast.
Figures 9, 10:
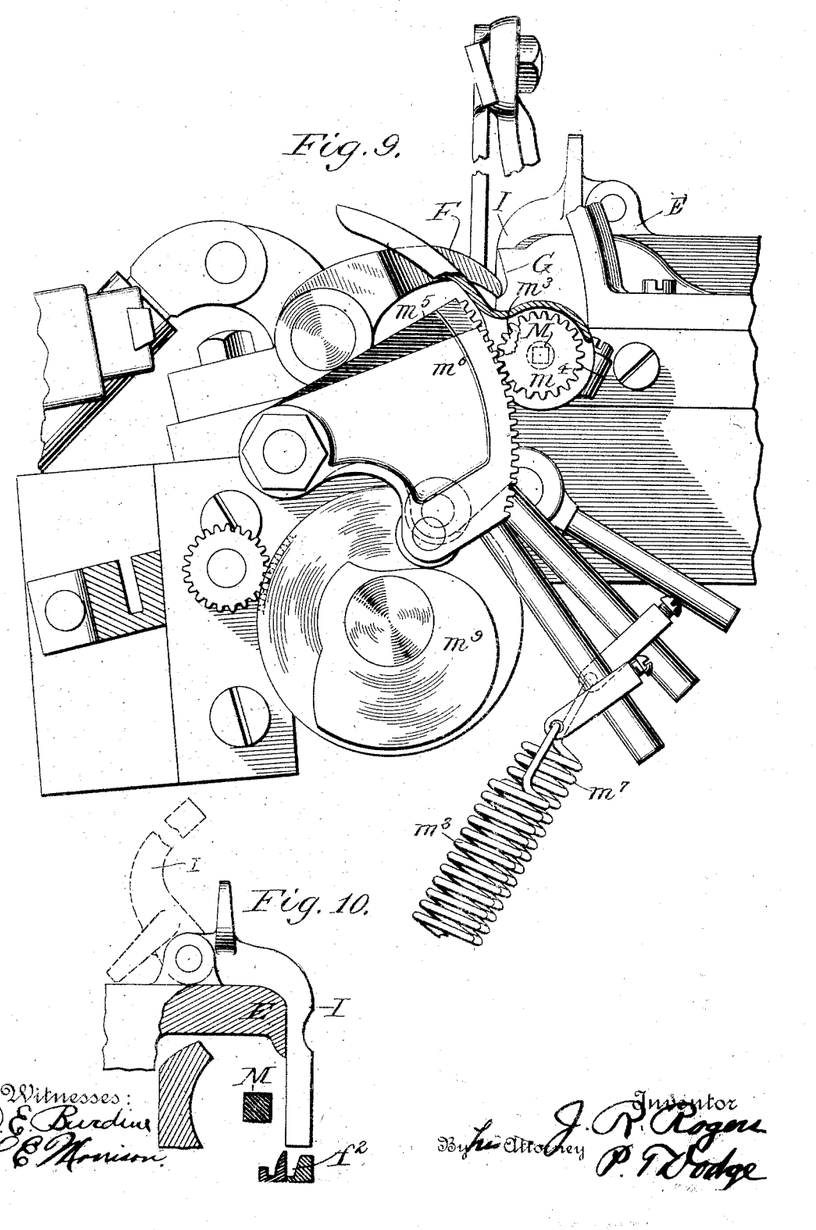
Fig. 9 is a front elevation of the mechanism for operating the spacer-shaft.
Fig. 10 is a detail of the movable block or abutment which divides the two matrix lines.

Heretofore the distance between the line-confining members G and H, in other words, the length of the assembling channel, was equal to the length or measure of a single line or slug. In the present machine I have increased the width of the parts so that the distance between the members G and H is somewhat more than twice the length of a line or slug. I now pivot to the frame as a permanent member of the machine a vertically swinging abutment I, which may be turned downward in the position shown in Figs. 2, and 10, so that it will divide the matrix space or channel at the center. This finger or abutment is held rigidly against side motion or motion lengthwise of the line, and serves as a solid support against which the matrices may be justified from either side. The distance between this finger and the abutment G is equal to the length of one slug, and there is an equal distance between the opposite side of the finger and the line-confining arm H.

Figure 1:
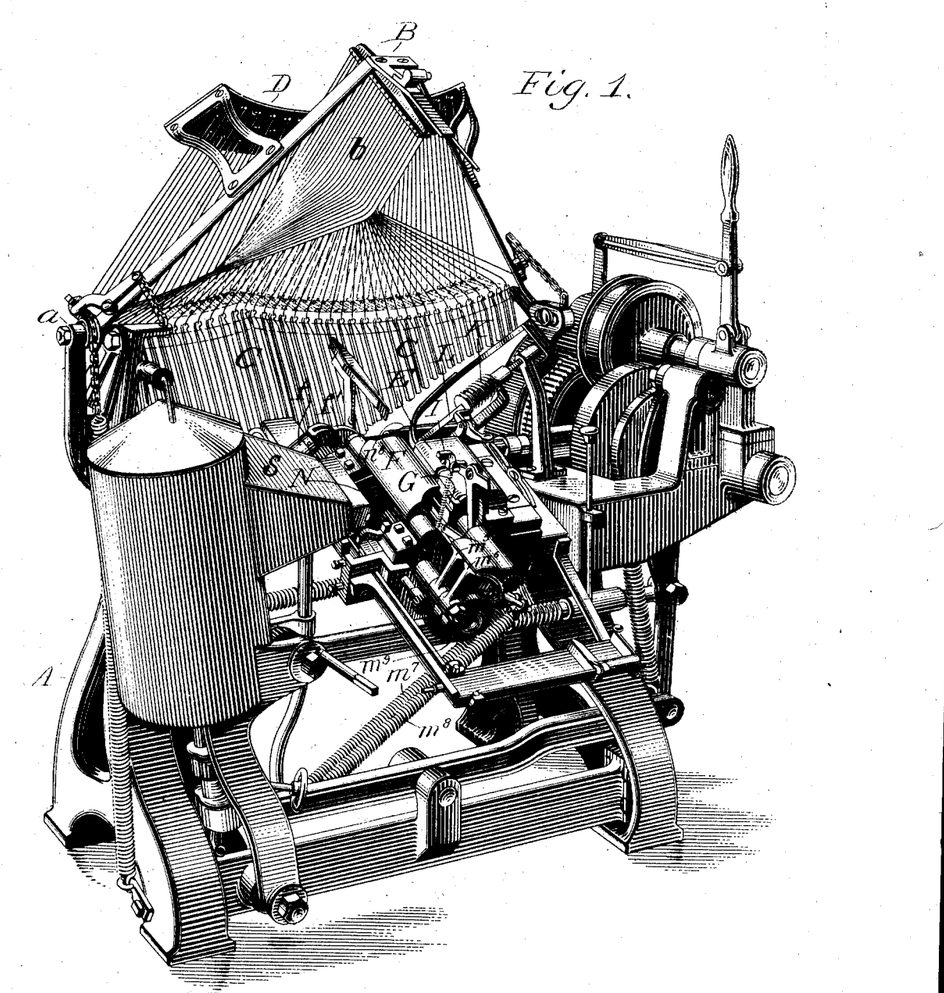
Figure 1 is a perspective view of the machine, with the top or assemblage frame tilted back to the position occupied when distributing the matrices.

In the operation of the machine, a line of matrices of the usual length suitable for the production of one slug is composed as usual, the finger I being at such time upturned out of the path of the matrices, as shown in Fig. 1. When the matrices for one line have been thus assembled, the finger is turned down and a second line of matrices is composed on the opposite side of the finger I between it and the arm H, which latter is finally turned up in position to confine the line. Thus it will be seen that the machine is adapted to contain two lines of matrices at one time, one on each side of the finger I.

Figures 3, 4, 5, 7, 8:
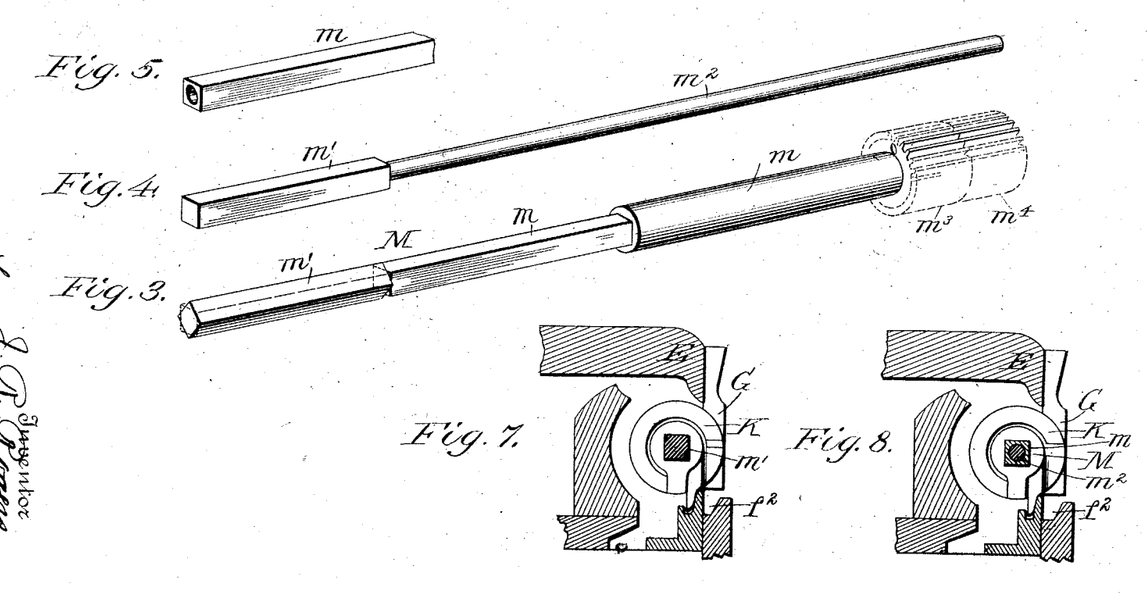
Fig. 3 is a perspective view of the shaft for operating the rotary spacing wedges or justifiers.
Figs. 4 and 5 are perspective views of parts of this shaft disconnected.
Fig. 7 is a cross-section through the matrix line and attendant parts on the line 7—7 Fig. 14.
Fig. 8 is a cross-section through the matrix line and attendant parts on the line 8—8 Fig. 14.

The justification or spacing-out of the matrix lines is effected as heretofore, by means of circular spacers or justifiers K, each consisting of two circular wedges joined side by side and arranged to turn one on the other. These wedges are stored normally on an inclined stationary rod L, which is extended downward and joined at its lower end to a rotary shaft M forming a continuation thereof and extended alongside of the space occupied by the matrix lines so that in the course of composition, the spacers K, released one after another, will pass down successively to the lines in course of composition, and occupy at one edge positions between the matrices, as shown in Figs. 7 and 8. When thus placed, one member of each spacer will be held from rotation while the other member may be rotated by turning the central shaft M, the effect being to increase the fingers of the spaces so that they will fill out or justify the lines to the predetermined lengths in the same manner as in Patent No. 557,232, as well understood by those skilled in the art.

Figure 6:
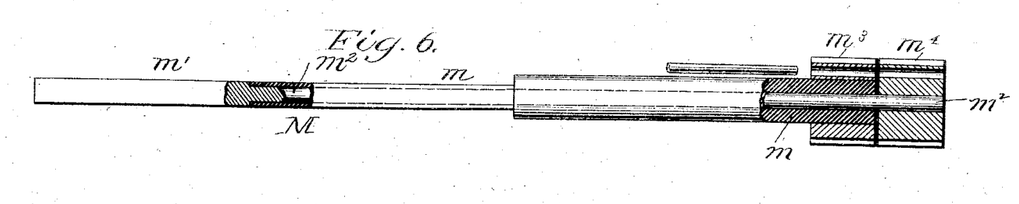
Fig. 6 is a side elevation of the same partly in section.

Inasmuch as there are, in the present machine, two lines of matrices to be justified at one time, and as one of these lines will frequently require more expansion than the other, it is necessary that the spacers in one line should be turned independently of those in the other line. To this end, the operating shaft M, commonly known as the justifier shaft, is divided at a point opposite the finger I into two independently revoluble parts $m$, $m'$, the latter having a reduced portion or stem $m^2$, which is extended longitudinally through a central hole in the part $m$. The part $m$ is provided at one end with a pinion $m^3$, and the part $m'$ is provided with a like pinion $m^4$, as clearly shown in Figs. 3 and 6. These pinions are acted upon respectively by sector racks $m^5$, $m^6$, see Figs. 1, 2, 9 and 14, urged downward respectively by springs $m^7$, $m^8$. The racks $m^5$, $m^6$, are acted upon by a lifting cam $m^9$, acting in opposition to the springs above mentioned.

The cam, acting through the intermediate parts, holds the justifier shaft M in its normal position during the composition or assemblage of the line, but after the matrices and spacers are assembled in the lines, the cams permit the racks to fall under the influence of the springs, which turn the two sections $m$, $m'$, of the shaft independently, thereby rotating the spacer members and causing the two lines of matrices to be independently justified.

Figure 11:
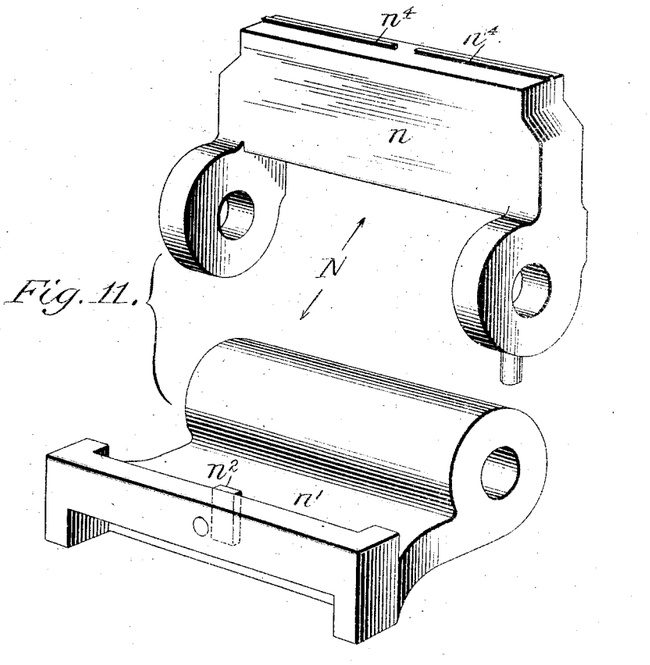
Fig. 11 is a perspective view of the two parts of the mold.
Figure 12:
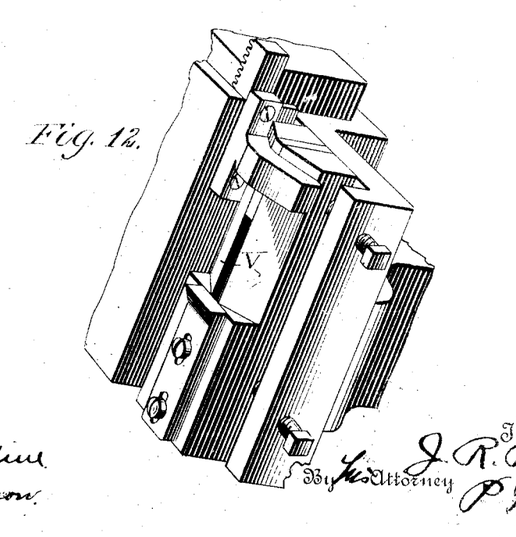
Fig. 12 is a perspective view showing the knives which trim the edges and sides of the slug, and also the knife which trims the bottom of the slug.

The matrices and spacers in the composed lines stand opposite a slotted mold N composed, as shown in Fig. 11, of upper and lower members $n$, $n'$, which are connected by a horizontal axis and so formed that when closed together, there will exist between them a space or slot corresponding in dimensions to the required slugs. This slot is of sufficient length to permit the casting of two slugs end to end on opposite sides of the central abutment or division $n^2$, Fig. 11, having a width equal to the finger I, and serving to separate the slugs during the casting operation.

Figures 13, 16:
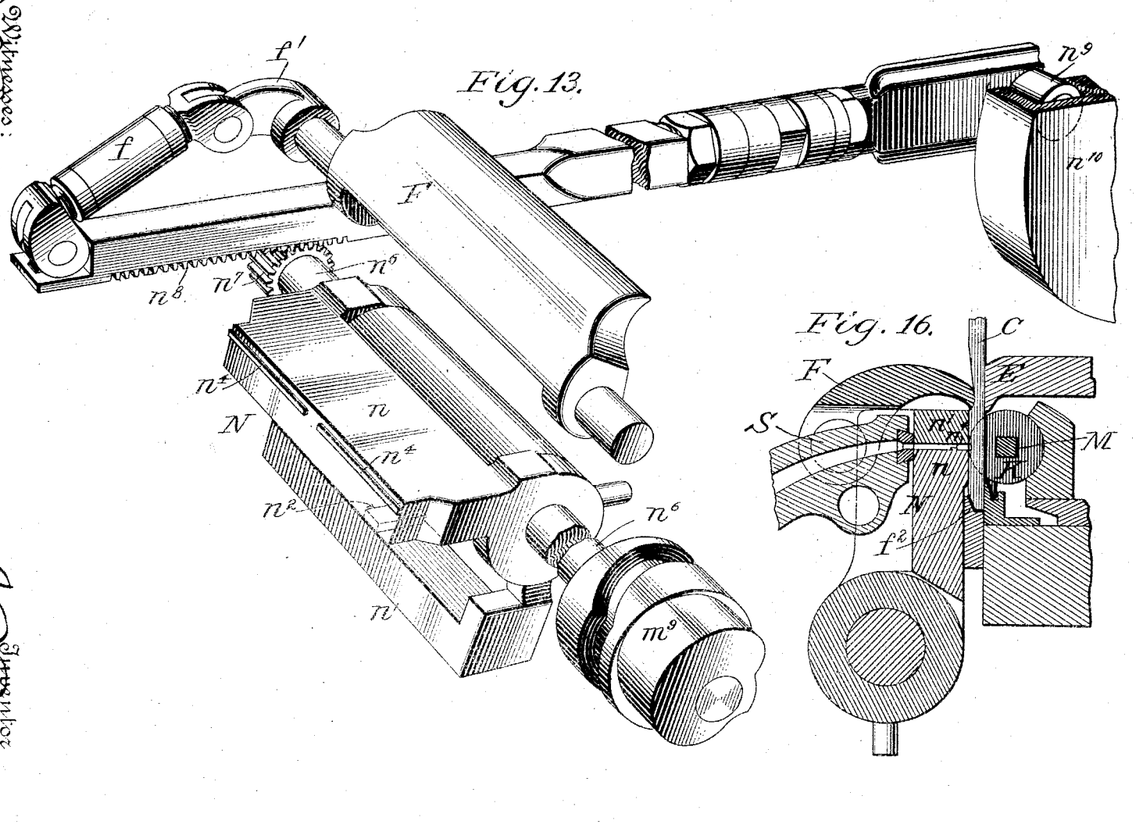
Fig. 13 is a perspective view showing the alinement bar, the mold, and their operating connections.
Fig. 16 is a cross-section through the mold, the matrix line and adjacent parts in casting position.
Figure 14:
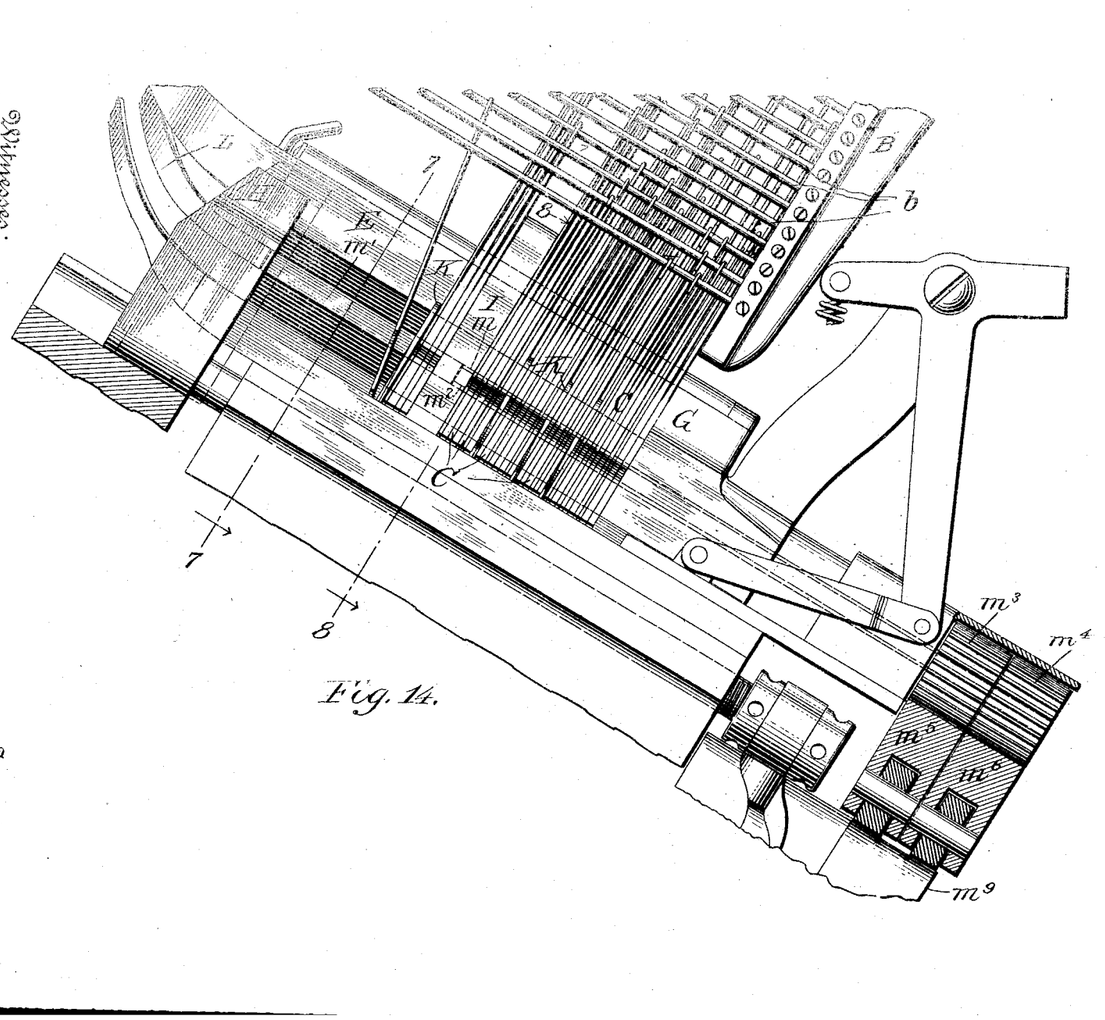
Fig. 14 is a view showing a composed line of matrices and a second line partially composed, together with the attendant parts of the machine.

When in casting position, the mold stands as in Fig. 16, against the face of the composed line of matrices and spacers, its rear side being closed for the time being by the mouth of the melting pot S, from which metal is delivered into the mold. The pot and its adjuncts may be of ordinary construction, and form no part of the present invention.

The upper member $n$ of the mold is provided with longitudinal dovetailed ribs $n^4$, over and around which the slugs are cast. After the casting action, the top member $n$ is swung upward, carrying with it the two slugs retained upon the ribs $n^4$, from which they are delivered endwise by the ejector $n^5$.

It is sometimes desirable to have the machine produce a single long slug in place of the two slugs. In such event, the finger I is turned back permanently out of action, and the abutment $n^2$ replaced by another having a dovetailed groove to correspond with the ribs $n^4$, so as to produce a continuous groove in the long slug.

The means for operating the mold and the matrix alining plate F are shown in Fig. 13, the upper part of the mold being carried by a rock-shaft $n^6$ having a pinion $n^7$ which engages a reciprocating rack-bar $n^8$, actuated by a roller $n^9$, secured to its end and seated in a grooved cam $n^{10}$ in the main-shaft. This rack-bar is connected by a link $f$ to a crank-arm $f'$ on one end of the alining bar F for the purpose of rocking the same about its journals or pivots.

Figure 15:
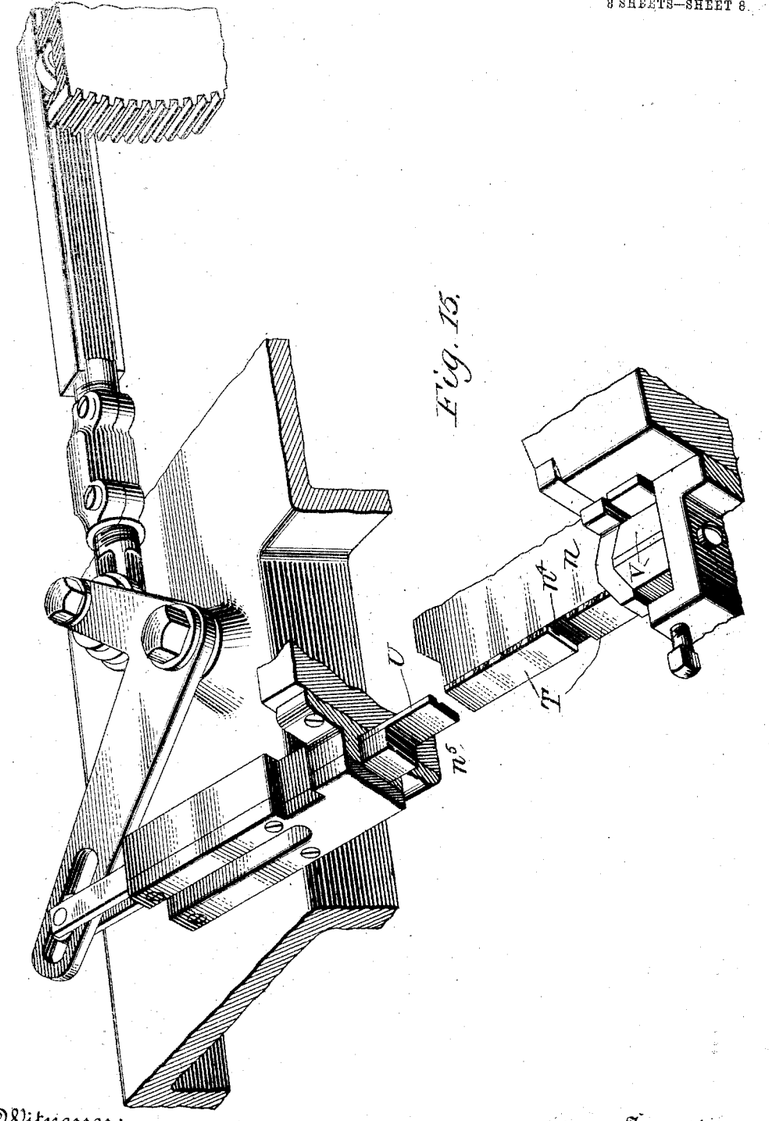
Fig. 15 is a perspective view of the mechanism for ejecting or delivering the slug from the mold, and trimming or shaving it to size.

The operation of the machine is as follows: The finger I being first turned backward out of action, the operator proceeds to assemble a line of matrices and spacers between the support E and the mold N, as usual. When all the matrices which will enter a single line are assembled, the finger I is turned down and the procedure is repeated until the composition of the second line is completed, after which the machine is set in motion as usual. The arm H swings into position to confine the end of the second matrix line. The rocking plate F closes against the matrices to aline them. The two sections $m$, $m'$, of the justifier-shaft are turned independently through the action of the springs $m^7$, $m^8$, and the intermediate parts so that the two lines are independently justified. The casting action then takes place as usual, after which the pot retreats and the mold is turned backward, the member $n$ lying in a horizontal position, as shown in Figs. 13 and 15, while the member $n'$ is turned downward to expose the slugs T. At this time the slugs are supported by the dovetailed ribs $n^4$ directly in the path of the reciprocating ejector blade. U which pushes the slugs endwise from the ribs and between trimming knives V.

The ejecting and trimming devices may be of ordinary construction.

Having described my invention, I claim and desire to secure by Letters Patent,—

1. In a linotype machine, the combination of matrices, a receiving channel, means for composing the matrices in line in said channel from one end, an abutment to support the forward end of the line, a second finger or abutment fixed against side motion and movable at will across the middle of the composing channel to divide the matrix line therein, and a movable abutment to confine the rear end of the matrix line; whereby the machine is adapted to compose and confine a single long line or two independent short lines.

2. In a linotype machine having a channel in which the matrices are composed with means for confining the matrix lines at their outer ends, a pivoted finger, I, fixed against lateral motion and adapted to be swung across the middle of the assembling channel at will; whereby the matrix line may be divided into two short lines during its composition and the short lines independently confined.

3. In a linotype machine, the combination of a channel wherein the matrices are assembled, means for confining the matrix lines endwise, a movable central finger or abutment for dividing the assembled matrices into two distinct lines, expansible spacers or justifiers, and means for adjusting the spacers of the two lines independently.

4. In combination with matrices, means for supporting the same in two distinct composed lines, rotary spacers, revoluble shafts for turning the spacers in the respective lines, and means for turning the shafts independently.

5. In a linotype machine, and in combination with the rotary expansible spacers, a shaft comprising two concentric portions $m$, and $m'$, and means substantially as shown for rotating said portions independently.

In testimony whereof I hereunto set my hand this tenth day of May, 1907, in the presence of two attesting witnesses.

JOHN R. ROGERS.

Witnesses:
ROBERT G. CLARK,
JESSIE I. SMITH.